Sept. 26, 1950 P. L. SPENCER 2,524,000
VACUUM CONDENSER
Filed Dec. 17, 1945
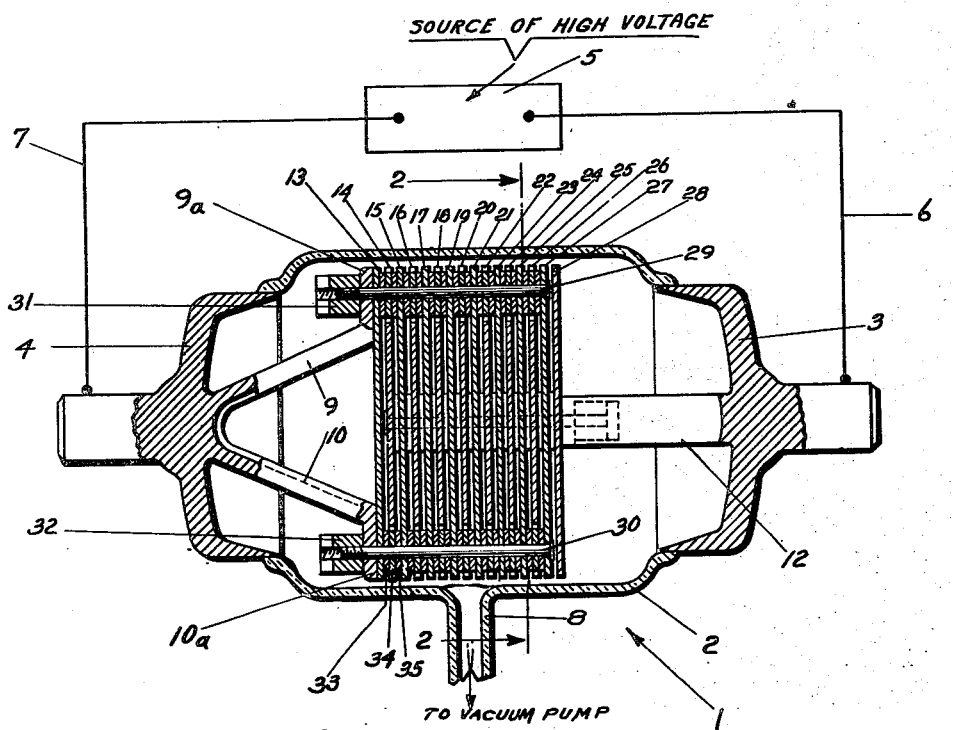
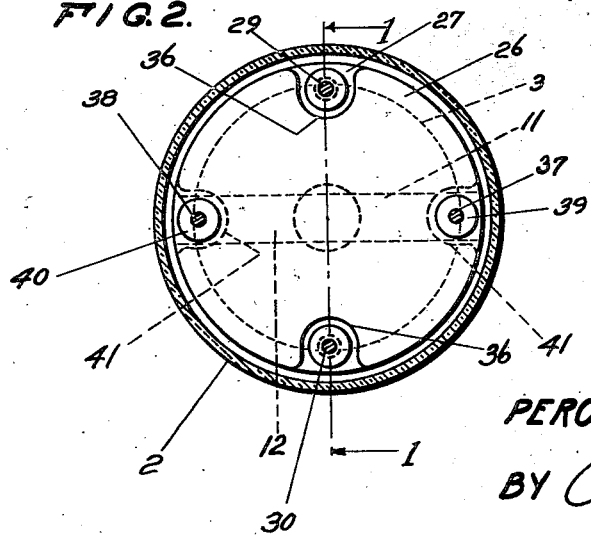
INVENTOR
PERCY L. SPENCER
BY
ATTY.

Patented Sept. 26, 1950

2,524,000

UNITED STATES PATENT OFFICE 2,524,000

VACUUM CONDENSER

Percy L. Spencer, West Newton, Mass., assignor to Raytheon Manufacturing Company, Newton, Mass., a corporation of Delaware Application December 17, 1945, Serial No. 635,536

4 Claims. (Cl. 175—41)

This invention relates to vacuum condensers which may be used for a variety of purposes, such as serving as capacitances in electrical circuits.

If two or more metallic plates are placed closely adjacent to but not touching each other, and alternate plates are connected to the same lead, the resulting device may be utilized as a condenser, as is well known. It is quite often found desirable to place such a condenser in a vacuum. When such a device is sealed in an envelope and the envelope evacuated to provide a vacuum condenser, difficulties arise in the operation of the device when minute amounts of gases are present within the envelope. Even though extreme care is taken in the process of evacuating the envelope, certain residual gases may still be present in the walls of the envelope and may not be removed during the exhaust process or may be evolved during normal operation of the condenser; such gases may deleteriously affect the dielectric constant, and therefore the capacitance, of the condenser, as well as its ability to withstand high voltages.

An object of the invention is to provide a vacuum condenser which will act while in normal use to trap or clean up gases evolved inside the sealed envelope of the condenser from parts of the envelope.

Another object is to devise a vacuum condenser which will function to trap residual gases which are not otherwise removed during the exhaust process.

Another object is to provide a vacuum condenser which is able to withstand extremely high voltages, and in which there is very little loss.

A further object is to devise a vacuum condenser which is so arranged as to be effectively cooled.

A still further object is to provide a vacuum condenser which will accomplish the above objects in an efficient manner, without undue complication of the structure of the condenser.

Other and further objects and advantages of the present invention will become apparent, and the foregoing will be understood in relation to the following exemplifications thereof, reference being had to the accompanying drawing in which:

Fig. 1 represents a longitudinal cross-section through the device during the process of manufacture thereof; and Fig. 2 is a transverse cross-section, being taken along line 2—2 of Fig. 1.

The vacuum condenser of this invention is indicated as a whole by 1. Glass envelope 2, more or less in the form of an open-ended hollow cylinder, is closed and sealed at opposite ends by copper closures 3 and 4. Opposite terminals of high potential source 5 are electrically connected to closures 3 and 4 by means of leads 6 and 7, respectively. The purpose of these connections will be referred to subsequently. The interior of envelope 2 is connected to a vacuum pump, not shown, by means of a tube 8.

Integral with closure 4 are two support arms 9 and 10, which extend inwardly from the closure in diametrically opposite directions, tapering outwardly from the center of the closure as shown and terminating in flat drilled portions 9a and 10a which extend, in a direction substantially perpendicular to the axis of cylindrical envelope 2, to points closely adjacent the inner wall of the glass envelope. Integral with closure 3 are two similar support arms 11 and 12, which are exactly similar to arms 9 and 10 except that arms 11 and 12 are displaced angularly ninety degrees from arms 9 and 10.

Located inside envelope 2 are a plurality of metallic condenser plates 13, 14, 15, 16, 17, 18, 19, 20, 21, 22, 23, 24, 25, 26, 27, and 28 arranged in two groups of alternate plates, plates 13, 15, 17, 19, 21, 23, 25, and 27 constituting one group, and plates 14, 16, 18, 20, 22, 24, 26, and 28 constituting the other. These plates are held in the assembled stacked or interleaved relationship shown in the following manner. Bolts 29 and 30, which have a flat head at one end and are threaded at the other, pass through drilled apertures in plates 13, 15, 17, 19, 21, 23, 25, and 27, in such a manner as to be in firm mechanical and electrical engagement therewith, and are threadedly engaged at their opposite ends by nuts 31 and 32 which bear against flat portions 9a and 10a of support arms 9 and 10, respectively. In order to maintain the proper spacing between plates 13, 15, etc. of this group, three metallic washers surrounding each bolt 29 and 30, such as washers 33, 34, and 35 indicated between plates 13 and 15, are provided between each of the plates of this series. It will therefore be seen that plates 13, 15, 17, 19, 21, 23, 25, and 27 are firmly held in stacked relation with respect to each other and are rigidly mechanically and electrically connected to support arms 9 and 10 and, therefore, to closure 4 also. In order to insulate this set of plates 13, 15, 17, etc. both mechanically and electrically from the other set 14, 16, 18, etc., bolts 29 and 30, and washers 33, 34, 35, etc. pass freely through two diametrically opposite arcuate slots, such as slots 36 of plate 26, in each of plates 14, 16, 18, 20, 22, 24, 26, and 28.

The group of plates 14, 16, 18, 20, 22, 24, 26, and 28 is held in stacked relationship and is firmly mechanically and electrically connected to closure 3 in a similar manner. Bolts 37 and 38 pass tightly through drilled apertures in plates 14, 16, 18, 20, 22, 24, 26, and 28, and are threadedly engaged by nuts similar to 31 and 32 but not shown, which bear on the flat portions of support arms 11 and 12. Three metallic washers, such as indicated at 39 and 40, surround each bolt between each of the plates of the series, to serve as spacers. Bolts 37 and 38, and also the washers such as 39 and 40, pass freely through two diametrically opposite arcuate slots, such as slots 41 of plate 27, in each of plates 13, 15, 17, 19, 21, 23, 25, and 27. Slots 41, etc., as will be seen, are angularly displaced ninety degrees from slots 36, to correspond with the ninety degree angular displacement of arms 9 and 10 with respect to arms 11 and 12.

It will therefore be seen that the set of plates 13, 15, 17, 19, 21, 23, 25, and 27 is firmly held in assembled relationship and is firmly attached both mechanically and electrically to closure 4, while the group of plates 14, 16, 18, 20, 22, 24, 26, and 28 is firmly held in assembled relationship and is firmly attached both mechanically and electrically to closure 3. The two sets of plates are therefore entirely independent of each other, both mechanically and electrically, so that if differential expansions tend to occur in the end plates 3 and 4, or in envelope 2, or in the sets of plates due to unequal heating or other causes, one set of plates is free to move relatively to the other set to thereby relieve the strain. It will also be noted that, since support arms 9, 10, 11, 12, and end closures 3 and 4 are massive and of good heat conducting material, such as copper, any heat developed in the plates will be readily communicated to the ambient surrounding the device and there dissipated.

The group of plates 13, 15, 17, 19, 21, 23, 25, and 27 is electrically connected to copper closure 4, as set forth above, and therefore serves as one terminal of the condenser, while group 14, 16, 18, 20, 22, 24, 26, and 28 is electrically connected to copper closure 3 and serves as the other terminal of the condenser.

In the condenser of this invention, the distance between all of the adjacent plates having opposite charges during the use of the device, for example, 13 and 14, 19 and 20, 24 and 25, is made of the order of the mean free path of the electrons in the gas in the evacuated envelope, or less. Also, the distance between each of the plates and the inner wall of the envelope is made of this same order. When two plates are separated a distance of this order of magnitude, an insulating short path results, so that when a potential is applied across the plates, no discharge can occur therebetween no matter how high the voltage used. Also, no longer discharge path can be had by jumping of one or of several plates in the stack, because the electrons will collide with the wall of the envelope before they can jump over any plates and will be effectively disposed of before any discharge can occur. Therefore no discharge can occur inside the envelope, and the condenser of this invention can withstand extremely high voltages when the envelope has been evacuated.

All of the condenser plates, and also all of the metallic washers or spacers, are made of a material which is very active chemically, or, in other words, one which will readily combine with oxygen or other undesired gases which may be present within the envelope 2 after evacuation and sealing of the envelope. Among the metals which have been found to be particularly useful for the above purpose may be mentioned chemically-pure aluminum and an alloy of aluminum containing barium. When plates made of such a material are exposed to certain gases, particularly oxygen, which are present in a confined space, aluminum oxide is readily formed on the surfaces of the plates; therefore the gas is effectively disposed of, so that the surrounding space is maintained substantially free of gas molecules. This natural combination of the gases with aluminum may be termed the ordinary type of gas cleanup.

An additional type of cleaning up of gases in this vacuum condenser may be termed the ionic type. Due to the fact that adjacent condenser plates are spaced apart a distance which is comparable to the mean free electron path, when a high concentration of gas ions results from electron bombardment of gas molecules present within said envelope, the ions are attracted to a condenser plate which has a charge opposite to that of the ions and are there effectively disposed of or trapped by combination with the material of said plate. Thus if during operation enough gas is liberated within the envelope so that the mean free path of the electrons drops to substantially less than the spacing between the plates, there is a momentary discharge between the plates, the ions are swept to one or the other of the adjacent plates according to their charges, and are there effectively trapped by combination with the material of the plate. In this way the gas is quickly removed from the tube to such an extent that the mean free path of the electrons is restored to its original value.

In order for the aluminum or aluminum-alloy condenser plates and spacers to combine readily with gases in the above manner, it is necessary that the plates and spacers have outer surfaces which are clean or untarnished by aluminum oxide. Since the aluminum plates and spacers as turned out in the fabricating processes, such as cutting and punching, invariably have a coating of oxide on them, it is first necessary to activate the aluminum, or to remove the oxide from the surfaces thereof, before the plates and spacers can be utilized as gas-eliminators. This is done according to the invention by placing a high voltage between the two sets of plates, causing electrical discharges to occur between them, while at the same time evacuating the envelope. These discharges between the plates disrupt or remove the aluminum oxide from the surfaces of the plates and spacers, leaving clean or activated aluminum surfaces. Of course, in order to enable discharges to occur between the plates, the gas pressure within the envelope must have a certain relatively high value in order for ionization to take place, since, as stated above, at very low pressures the spacing between condenser plates and between the plates and the envelope walls is of the same order of magnitude as the mean free electron path, and therefore ionization cannot occur to any appreciable extent. Closure 3 is connected by lead 6 to one terminal of the high potential source 5, while closure 4 is connected by lead 7 to the other terminal of said source in order to place a high potential across pairs of adjacent plates 13—14, 15—16, etc., which will cause discharges to occur between them, resulting in disruption of the aluminum oxide film on the surfaces of the plates and spacers.

In the manufacture of the vacuum condenser of the invention, the condenser plates 13—28 are mounted inside the envelope 2, tube 8 is connected to a vacuum pump, and a high voltage source 5 is connected across leads 6 and 7. While the electrical discharges are taking place as above described, the envelope is evacuated, which process removes the oxide coating from the surfaces of the plates and spacers. When a desired point has been reached, the envelope is sealed, leaving the plates of activated aluminum alloy in condition to effectively dispose of any undesired gases remaining or later coming into being within the envelope. The condenser is then ready for use.

The invention is not limited to the particular details described above as many equivalents will suggest themselves to those skilled in the art. The condenser plates may be of any desired shape or configuration, and they may be mounted in the envelope by any suitable means rather than by the means described. It is accordingly desired that the appended claims be given a broad interpretation commensurate with the scope of this invention within the art.

What is claimed is:

1. A plate-type condenser in an evacuated enclosure, the plates of said condenser being made of aluminum, and the exposed surfaces of said aluminum plates being substantially free from oxides.

2. A plate-type condenser in an evacuated enclosure, the plates of said condenser being made of an aluminum-barium alloy, and the exposed surfaces of said plates being substantially free from oxides.

3. A vacuum condenser comprising an evacuated envelope and a plurality of plates mounted therein, alternate plates of said plurality being connected to one of a pair of common leads, the surfaces of said plates comprising free aluminum, whereby the unoccupied space in said envelope will remain substantially free of gases, due to reaction of said gases with said aluminum surfaces.

4. A vacuum condenser comprising an evacuated envelope and a plurality of plates mounted therein, alternate plates of said plurality being connected to one of a pair of common leads, said plates being made of an aluminum-barium alloy, and the surface of said plates being substantially free of oxides, whereby the unoccupied space in said envelope will remain substantially free of gases, due to reaction of said gases with said aluminum-barium alloy surfaces.

PERCY L. SPENCER.

REFERENCES CITED

The following references are of record in the file of this patent:

UNITED STATES PATENTS

| Number | Name | Date |
|---|---|---|
| 1,545,207 | Smith | July 7, 1925 |
| 1,633,285 | Proctor | June 21, 1927 |
| 1,699,112 | MacRae | Jan. 15, 1929 |
| 1,789,263 | Nyman | Jan. 13, 1931 |
| 1,878,338 | Smith | Sept. 20, 1932 |
| 1,922,162 | King | Aug. 15, 1933 |
| 2,171,127 | Kohman | Aug. 29, 1939 |
| 2,339,663 | Teare | Jan. 18, 1944 |
| 2,444,158 | Driggs | June 29, 1948 |

FOREIGN PATENTS

| Number | Country | Date |
|---|---|---|
| 395,420 | Great Britain | July 20, 1933 |